US012212846B2

(12) United States Patent
Ishibashi et al.

(10) Patent No.: US 12,212,846 B2
(45) Date of Patent: Jan. 28, 2025

(54) IMAGE PROCESSING APPARATUS, MEASUREMENT METHOD, AND STORAGE MEDIUM FOR MEASURING DISTANCE FROM IMAGE

(71) Applicant: CANON KABUSHIKI KAISHA, Tokyo (JP)

(72) Inventors: Takuya Ishibashi, Tokyo (JP); Yosuke Eguchi, Tokyo (JP); Satoru Komatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 18/052,151

(22) Filed: Nov. 2, 2022

(65) Prior Publication Data
US 2023/0292004 A1 Sep. 14, 2023

(30) Foreign Application Priority Data
Nov. 5, 2021 (JP) ................................. 2021-181188

(51) Int. Cl.
*H04N 23/67* (2023.01)
*H04N 23/60* (2023.01)

(52) U.S. Cl.
CPC ........... *H04N 23/671* (2023.01); *H04N 23/64* (2023.01)

(58) Field of Classification Search
CPC .... H04N 23/671; H04N 23/64; H04N 23/672; H04N 23/675; H04N 23/611; G02B 7/28
See application file for complete search history.

(56) References Cited

U.S. PATENT DOCUMENTS 10,237,469 B2 * 3/2019 Iwamoto ............... H04N 23/959
2016/0088212 A1 * 3/2016 Narang .................. H04N 23/51
348/348

FOREIGN PATENT DOCUMENTS

JP 2021032984 A 3/2021

* cited by examiner

*Primary Examiner* — Ahmed A Berhan
(74) *Attorney, Agent, or Firm* — Canon U.S.A., Inc. IP Division

(57) ABSTRACT

An apparatus includes one or more processors, and a memory storing instructions which, when executed by the one or more processors, cause the apparatus to function as an image acquisition unit configured to acquire a captured image, a parameter acquisition unit configured to acquire a parameter recorded when the image is captured, a determination unit configured to determine a target area in the image using the parameter corresponding to the image, an evaluation value calculation unit configured to calculate one or more evaluation values from the target area based on a number of the target areas and a size of the target area, a representative evaluation value calculation unit configured to calculate a representative evaluation value from the evaluation value, and a distance information calculation unit configured to calculate distance information about a distance to a subject in the image based on the representative evaluation value.

20 Claims, 15 Drawing Sheets

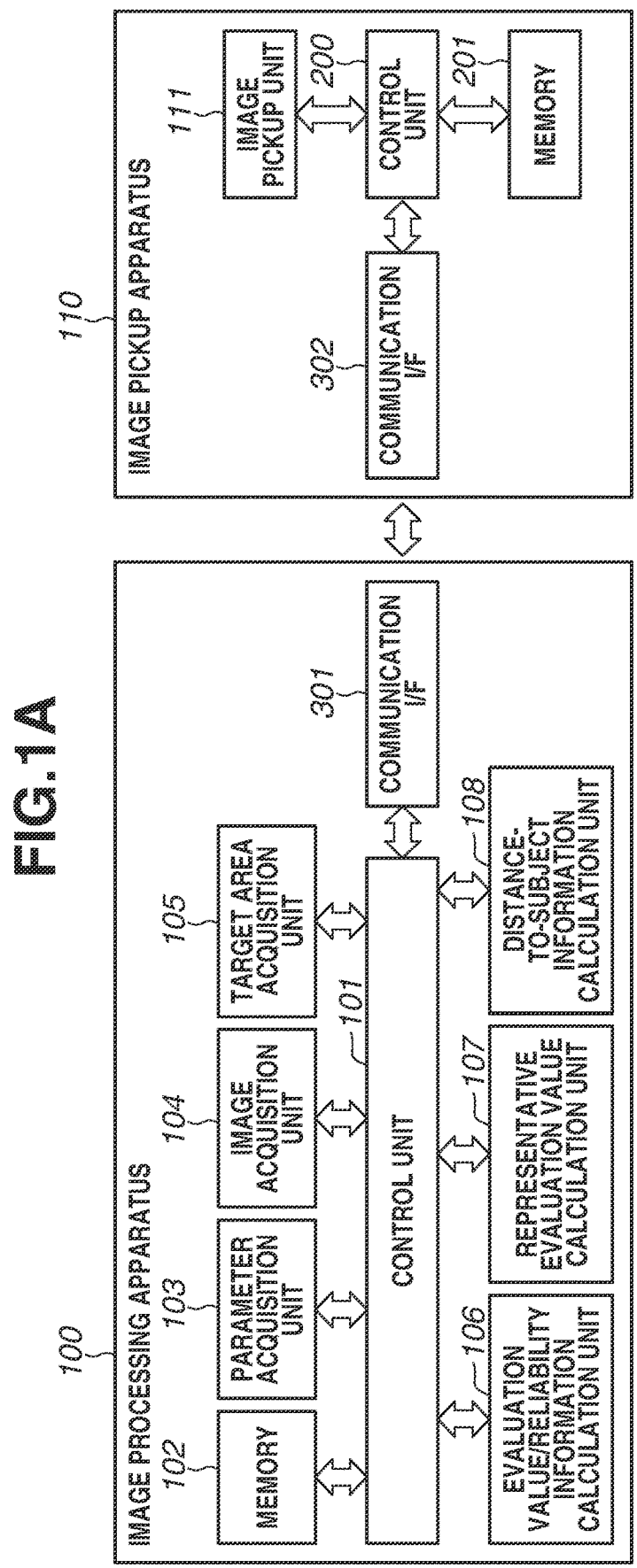

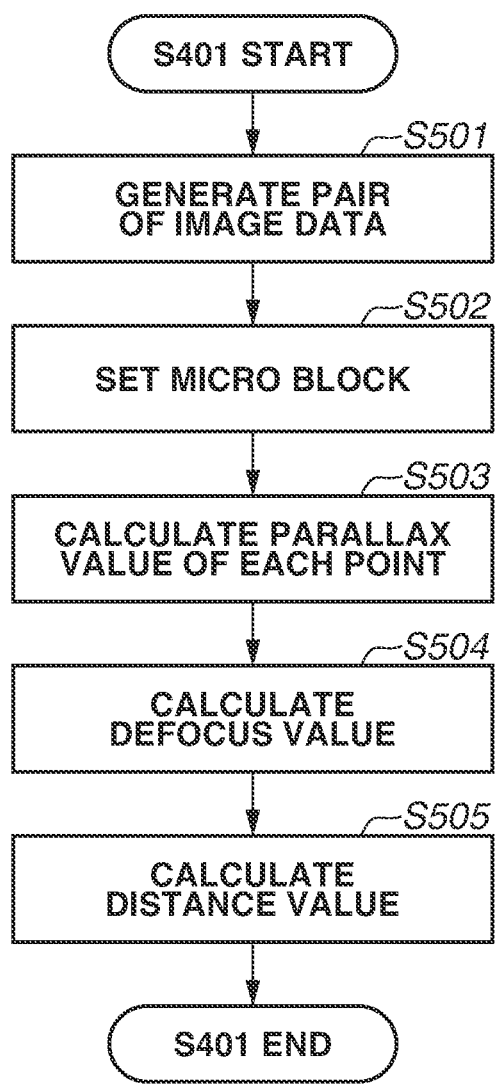

FIG.6A
A-IMAGE 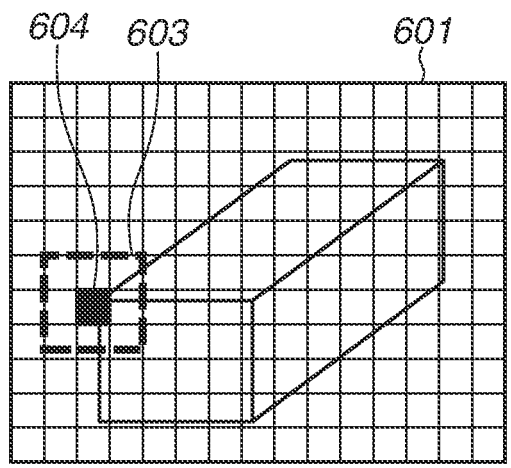 B-IMAGE 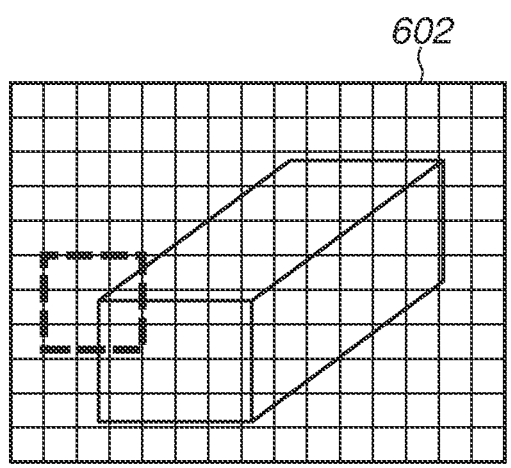
FIG.6B
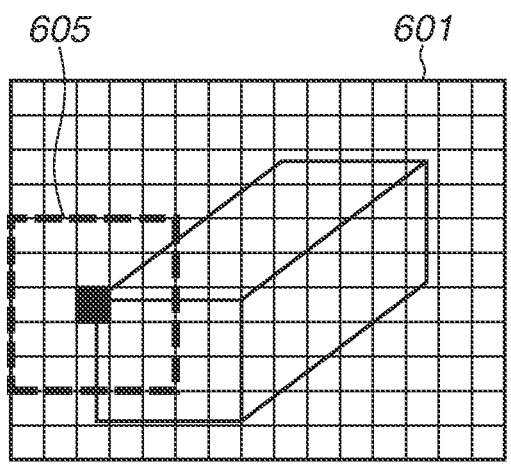

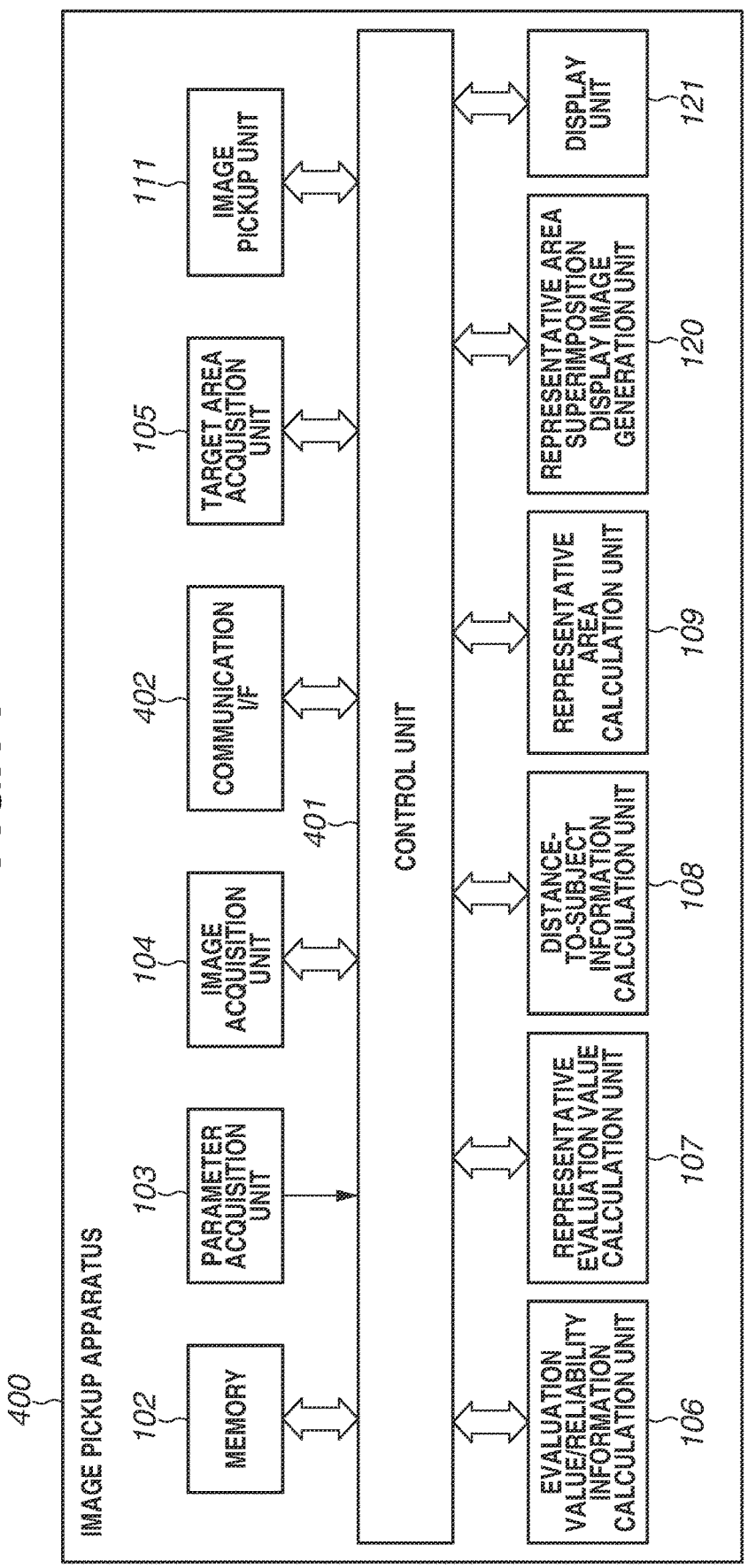

IMAGE PROCESSING APPARATUS, MEASUREMENT METHOD, AND STORAGE MEDIUM FOR MEASURING DISTANCE FROM IMAGE

BACKGROUND

Technical Field

The aspect of the invention relates to an image processing apparatus for measuring a distance from an image, and particularly to a method of acquiring distance information about the distance from an image processing apparatus to a subject.

Description of the Related Art

Distance information about the distance from an image pickup apparatus to a subject can be calculated from in-focus distance information determined from information about the position of the lens of the image pickup apparatus and the amount of defocus of the subject. Japanese Patent Laid-Open No. 2021-032984 discusses a technique for performing focus adjustment of an image pickup optical system, based on the amount of defocus in an automatic focus (AF) frame area (the area of a target subject, i.e., an area to be subjected to focus adjustment) in image capturing and the amount of defocus of the peripheral area thereof.

In the technique discussed in Japanese Patent Laid-Open No. 2021-032984, however, an appropriate parallax value or defocus value cannot be determined with a plurality of AF frame areas or a large AF frame area, allowing accurate distance information about a distance to a subject not to be acquired.

SUMMARY

According to an aspect of the embodiments, an apparatus includes one or more processors, and a memory storing instructions which, when executed by the one or more processors, cause the apparatus to function as an image acquisition unit configured to acquire a captured image, a parameter acquisition unit configured to acquire a parameter recorded when the image is captured, a determination unit configured to determine a target area in the image using the parameter corresponding to the image, an evaluation value calculation unit configured to calculate one or more evaluation values from the target area based on a number of the target areas and a size of the target area, a representative evaluation value calculation unit configured to calculate a representative evaluation value from the evaluation value, and a distance information calculation unit configured to calculate distance information about a distance to a subject in the image based on the representative evaluation value.

Further features of the disclosure will become apparent from the following description of exemplary embodiments with reference to the attached drawings.

BRIEF DESCRIPTION OF THE DRAWINGS

FIG. 5 is an operation flowchart illustrating a method of calculating the evaluation value according to the first exemplary embodiment.

FIGS. 6A and 6B illustrate micro blocks according to the first exemplary embodiment.

FIG. 14 is a block diagram illustrating an overall configuration according to a third exemplary embodiment.

DESCRIPTION OF THE EMBODIMENTS

Some exemplary embodiments of the disclosure will be described in detail below with reference to the attached drawings.

The following exemplary embodiments do not limit the disclosure according to the claims. A plurality of features is described in the exemplary embodiments, but not all of those features are used in the disclosure, and any combination of features may be used. Like numbers refer to like components in the attached drawings, and redundant description thereof will be omitted.

(Description of Image Processing Apparatus)

A first exemplary embodiment of the disclosure will be described in detail with reference to attached drawings.

Figure 1B:
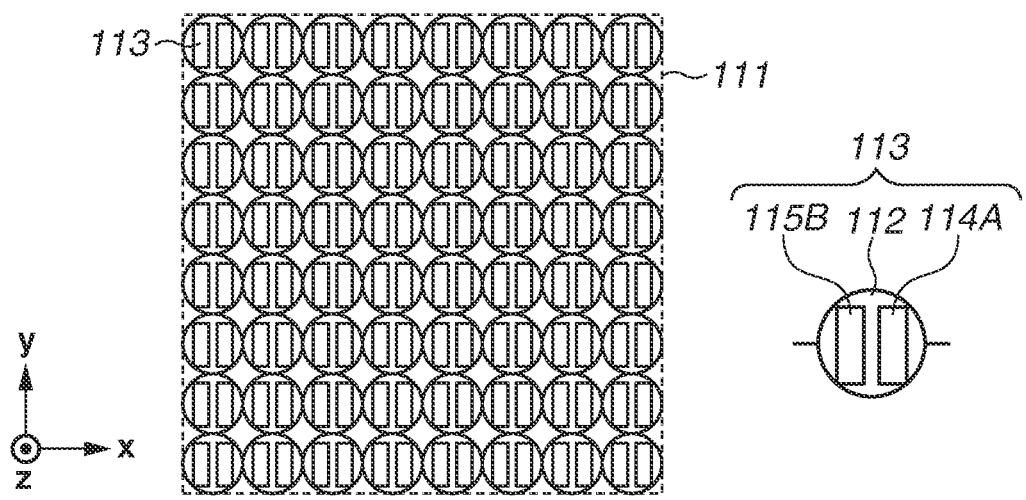
FIG. 1A is a block diagram illustrating an overall configuration according to a first exemplary embodiment, and FIGS. 1B and 1C each illustrates a configuration according to the first exemplary embodiment.

FIGS. 1A to 1B illustrate an image processing apparatus 100 and an image pickup apparatus 110 according to the present exemplary embodiment.

FIG. 1A illustrates the image processing apparatus 100, the image pickup apparatus 110, and a control unit 101, and a control unit 200 according to the present exemplary embodiment.

The image processing apparatus 100 and the image pickup apparatus 110 include the control unit 101 and the control unit 200, respectively, which control exchange of information in the respective apparatuses. The image processing apparatus 100 and the image pickup apparatus 110 include a communication interface (I/F) 301 and a communication I/F 302, respectively, so that the image processing apparatus 100 and the image pickup apparatus 110 exchange information under the control of the control units 101 and 200.

The image pickup apparatus 110 includes an image pickup unit 111, the control unit 200, a memory 201, and the communication I/F 302, as modules. The image pickup unit 111 picks up an image of an object to be measured, and supplies the image to an image acquisition unit 104 of the image processing apparatus 100 via the communication OF 301 and the communication I/F 302 under the control of the control unit 200. Further, the image pickup unit 111 supplies parameter information in image capturing to a parameter acquisition unit 103 of the image processing apparatus 100 via the communication I/F 301 and the communication I/F 302 based on an instruction from the control unit 200.

The memory 201 is controlled by the control unit 200 to read out information for processing in each of the modules, and save results of the processing in each of the modules.

The image processing apparatus 100 includes the control unit 101, a memory 102, the parameter acquisition unit 103, the image acquisition unit 104, a target area acquisition unit 105, an evaluation value/reliability information calculation unit 106, a representative evaluation value calculation unit 107, and a distance-to-subject information calculation unit 108, and the communication I/F 301.

The memory 102 is controlled by the control unit 101 to read out information for processing in each of modules, and save results of the processing in each of the modules.

The parameter acquisition unit 103 acquires the parameter information in image capturing through communication with the image pickup apparatus 110 via the communication I/F 301 and the communication I/F 302 based on an instruction from the control unit 101, and supplies the acquired information to the memory 102 under the control of the control unit 101. The parameter acquired in this process will be described below.

The image acquisition unit 104 acquires an image picked up by the image pickup unit 111 of the image pickup apparatus 110 or an image picked up by an apparatus other than the image pickup apparatus 110, and supplies the acquired image to the memory 102.

Based on an image acquired by the image acquisition unit 104 and information about at least one of the parameters acquired by the parameter acquisition unit 103, the target area acquisition unit 105 detects a target area within the image, and supplies the detected target area to the memory 102. The target area is determined, for example, using an automatic focus (AF) frame area or a face recognition area.

The evaluation value/reliability information calculation unit 106 calculates an evaluation value for evaluating the target area and reliability information, and supplies the evaluation value and the reliability information to the memory 102.

The representative evaluation value calculation unit 107 calculates a representative evaluation value of the target area based on the evaluation value of the target area calculated by the evaluation value/reliability information calculation unit 106, and supplies the calculated representative evaluation value to the memory 102.

The distance-to-subject information calculation unit 108 calculates distance information about a distance to a subject based on in-focus distance information and the representative evaluation value, and supplies the calculated distance information to the memory 102.

FIG. 1B illustrates a configuration of the image pickup unit 111 of the image pickup apparatus 110 according to the present exemplary embodiment.

In the image pickup unit 111, pixels 113 are two-dimensionally regularly arranged. Each of the pixels 113 is composed of a microlens 112 and a pair of photoelectric converters 114A and 115B (hereinafter referred to as "pupil division pixels 114A and 115B"). In the present exemplary embodiment, an image picked up by the pupil division pixel 114A is an A-image, and an image picked up by the pupil division pixel 115B is a B-image. A composite image formed by the A-image and the B-image is an AB-image (at least two of the A-image, the B-image, or the AB-image may each also be referred to as "image for ranging"). The configuration of the image pickup unit 111 makes it possible to acquire a pair of image data (the A-image and the B-image) based on a subject light flux passing through each of different pupil areas of an image pickup optical system. This allows a calculation of a shift amount between an A-image and a B-image as a parallax value using the A-image, the B-image, and parameters such as a conversion coefficient determined by the open angle between the centroids of the respective light fluxes passing through the ranging pupil pair.

Figure 1C:
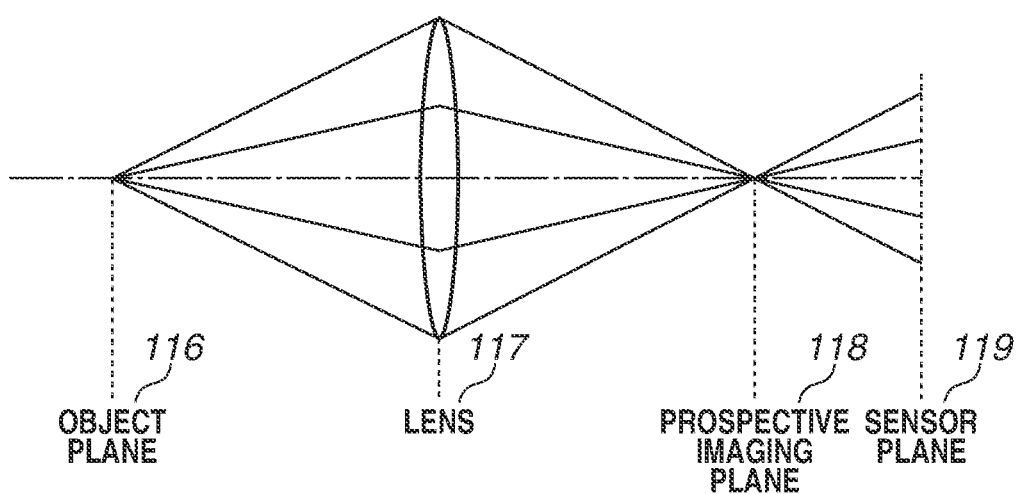

FIG. 1C illustrates a configuration of the image pickup optical system of the image pickup apparatus 110 according to the present exemplary embodiment. The image pickup unit 111 focuses light coming from an object (an object plane) 116 on a prospective imaging plane 118 through a lens 117, and receives the focused light on a sensor plane 119. The image pickup unit 111 converts the received optical image into an electrical signal, thereby producing an image signal corresponding to the optical image. The image pickup unit 111 of the present exemplary embodiment includes an analog-to-digital (A/D) converter, and outputs a digital image signal. In this way, the received optical image can be acquired as an image.

A method for implementing the first exemplary embodiment of the disclosure with the image processing apparatus 100 and the image pickup apparatus 110 thus configured will be described in detail with reference to an operation flowchart illustrated in FIG. 2. Each component of the image processing apparatus 100 and the image pickup apparatus 110 operates under the control of the control unit 101 of the image processing apparatus 100 and the control unit 200 of the image pickup apparatus 110, so that the following operation procedure proceeds.

First, in step S201, the parameter acquisition unit 103 acquires parameters. The parameter acquisition unit 103 acquires the parameters through communication with the image pickup apparatus 110 as described above. The parameter acquisition unit 103 can acquire information about parameters which are recorded in an image when the image is picked by the image pickup apparatus 110.

The parameter acquisition unit 103 acquires at least one of the following pieces of information.

The distance from the sensor plane of an image pickup apparatus to an in-focus position (a)

A conversion coefficient determined by the open angle between the centroids of the respective light fluxes passing through a pair of ranging pupils (b)

The minimum size of a target area (c)

A focal length (d)

An AF frame area (e)

A face recognition area (f)

The distance from the image-side principal point in the lens of an image pickup unit of an image pickup apparatus to the sensor plane . . . (g)

In step S202, the image acquisition unit 104 acquires an image.

Here, the image acquired by the image acquisition unit 104 is an image picked up by the image pickup apparatus 110 or an image picked up by an apparatus other than the image pickup apparatus 110.

In step S203, the representative evaluation value calculation unit 107 calculates a representative evaluation value.

Details of the method of calculating the representative evaluation value will be described with reference to FIG. 3.

In step S301, the target area acquisition unit 105 acquires a target area. A target area may be acquired by a method of acquiring a target area based on the position of an AF frame area recorded in the image data when an image is picked up by an image pickup apparatus. In some embodiments, a target area is acquired by a method of acquiring an area corresponding to information (image recognition information) recognized by subjecting picked-up image data to image recognition processing, as a target area.

In the present exemplary embodiment, the acquisition of the target area will be specifically described using the method with the position of the AF frame area recorded in the image when the image is picked up by the image pickup apparatus. If the position of the target area is determined, the subsequent processing procedure similarly proceeds in the case of acquiring the position of the target area using the image recognition processing as well, and thus will not be separately described.

If an image is captured in a mode with multipoint AF (an AF sequence of operating to focus on a plurality of areas in a screen) set, the target area acquired by the target area acquisition unit 105 is a plurality of areas. In addition, a target area having a size larger than typical can be set depending on the image pickup apparatus. In this case, the target area acquisition unit 105 can acquire a target area of a large size.

In step S302, the evaluation value/reliability information calculation unit 106 calculates an evaluation value of the target area and reliability information. The method of calculating the evaluation value of the target area and the method of calculating the reliability information will be described with reference to FIG. 4.

Figure 4:
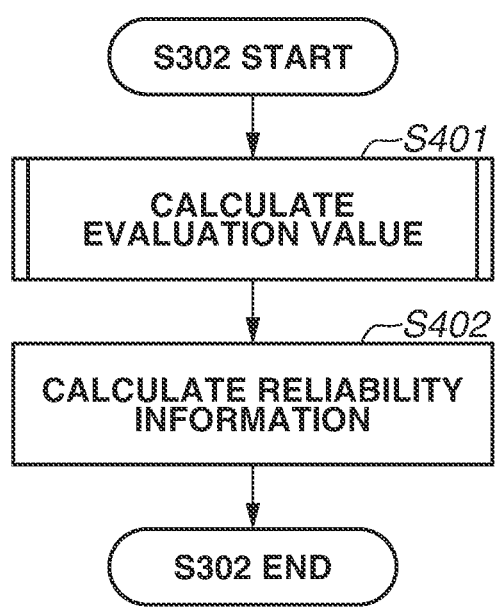
FIG. 4 is an operation flowchart illustrating an operation in a method of calculating an evaluation value and reliability information according to the first exemplary embodiment.

FIG. 4 is a flowchart illustrating processing for calculating the evaluation value of the target area and the reliability information.

In step S401, the evaluation value/reliability information calculation unit 106 calculates the evaluation value of the target area. The evaluation value can be acquired with, for example, a parallax value, a defocus value, and a distance value. The method of calculating the evaluation value will be described with reference to FIG. 5.

(Description of Method of Calculating Evaluation Value)

FIG. 5 is a flowchart illustrating processing for calculating the evaluation value of the target area.

In step S501, the evaluation value/reliability information calculation unit 106 generates a pair of image data, from the image acquired by the image acquisition unit 104 in step S202. If the image pickup apparatus 110 includes a light emitting unit, the configuration allows placing a pattern such as a grid in the light emitting unit, capturing an image in which the pattern is projected onto a subject, and using the captured image. In this case, a pattern can be added to a subject without texture, providing a higher accurate parallax calculation.

In step S502, the evaluation value/reliability information calculation unit 106 sets a micro block for each of the A-image and the B-image generated in step S501. The micro block is generally synonymous with a window to be set when template matching is performed. FIG. 6A is a diagram for describing step S502. On an A-image 601 and a B-image 602, a micro block as represented by a micro block 603 is set. In the present exemplary embodiment, a target pixel at the center of the micro block is set for each pixel of an input image. The micro block as represented by the micro block 603 illustrated in FIG. 6A is set for a target pixel 604. FIG. 6B is a diagram for describing the shape of the micro block. The size of the micro block can be changed as represented by a micro block 605.

In step S503, the evaluation value/reliability information calculation unit 106 calculates a parallax value of each point, by performing correlation computation processing in the set micro block. The parallax value in the present exemplary embodiment is synonymous with an image shift amount determined from a shift amount between two data streams. The correlation computation generalizes and expresses a pair of pixel data in the micro block as a data series E and a data series F. The evaluation value/reliability information calculation unit 106 calculates a correlation amount C(k) in a shift amount k between two data streams using a formula (1), while shifting the data series F relative to the data series E.

$$C(k) = \Sigma |E(n) - F(n+k)| \quad (1)$$

In the formula (1), the correlation amount C(k) is calculated for a number n of the data series. The shift amount k is an integer, and is a relative shift amount in units of data intervals of the image data. The shift amount k is synonymous with a parallax in a stereo matching method.

Figure 7:
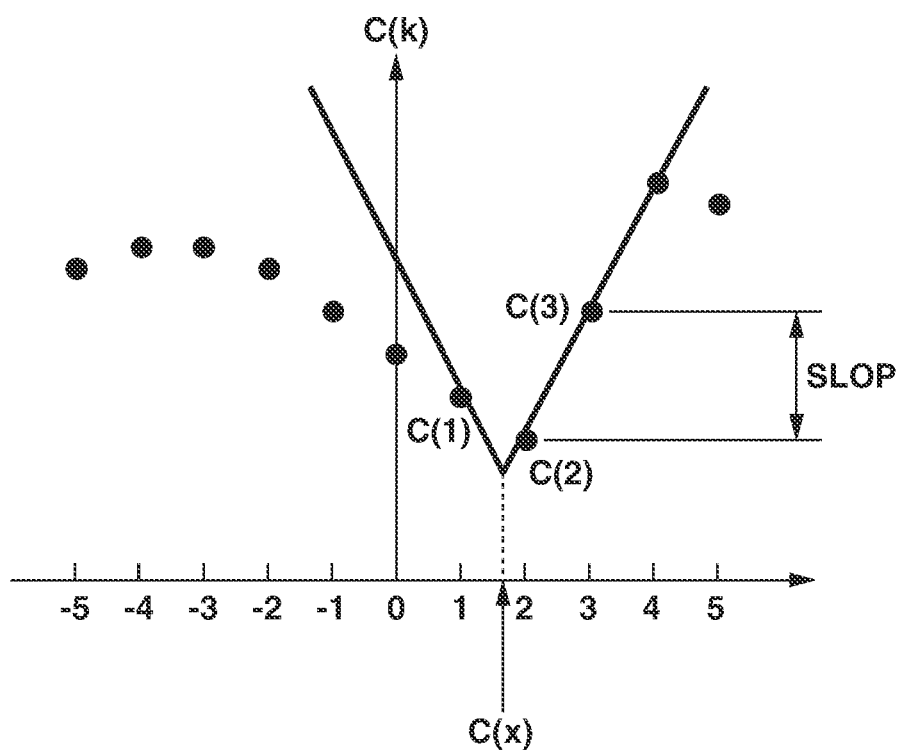
FIG. 7 illustrates a relationship between parallax values and correlation values according to the first exemplary embodiment.

FIG. 7 illustrates a graph in which the horizontal axis represents parallax values and the vertical axis represents correlation amounts C(k), as an example of the calculation result of the formula (1).

As illustrated in FIG. 7, the minimum of correlation amount C(k) is at the parallax value corresponding to the highest correlation between a pair of data series. A parallax value x that provides a minimum value C(x) among continuous correlation amounts is determined using a three-point interpolation scheme based on the following formulas (2) to (5).

$$x = kj + D/\text{SLOP} \quad (2)$$

$$C(x) = C(kj) - |D| \quad (3)$$

$$D = \{C(kj-1) - C(kj+1)\}/2 \quad (4)$$

$$\text{SLOP} = \text{MAX}\{C(kj+1) - C(kj), C(kj-1) - C(kj)\} \quad (5)$$

Here, kj is k at which the correlation amount C(k) which is discrete is minimum.

A shift amount x calculated by the formula (2) is used as a parallax value in a pair of pupil division images. The unit of the image parallax value x is pixel.

In step S504, a defocus value DEF for the prospective imaging plane of a subject image plane can be calculated by the following formula (6), based on the parallax value x calculated by the formula (2).

$$\text{DEF} = -x/BL \quad (6)$$

BL in the formula (6) is a conversion coefficient determined by the open angle between the centroids of the respective light fluxes passing through the ranging pupil pair.

In step S505, a distance value z representing the distance from the sensor plane of the image pickup unit of the image pickup apparatus to the subject is calculated using the defocus value calculated in step S504. The distance value z at each point can be calculated by the following formulas (7) and (8).

$$\text{dist} = 1/(1/(\text{dist}\_d + \text{DEF}) - 1/f) \quad (7)$$

$$z = \text{length} - \text{dist} \quad (8)$$

In these formulas, "dist" represents the distance from the in-focus position to the subject, "dist_d" represents the distance from the image-side principal point in the lens of the image pickup unit of the image pickup apparatus to the sensor plane, "f" represents the focal length, and "length" represents the distance from the sensor plane of the image pickup apparatus to the in-focus position.

In this way, the parallax value, the defocus value, and the distance value at each pixel position can be calculated by repeating the calculation while shifting the target pixel position by one pixel.

The parallax value, the defocus value, and the distance value representing the distance from the sensor plane of the image pickup unit of the image pickup apparatus to the subject can be thereby acquired. This allows a reduction in the calculation cost by limiting the above-described processing to the target area.

(Description of Method of Calculating Reliability Information)

In step S402, the evaluation value/reliability information calculation unit 106 calculates the reliability information. The reliability information can be calculated from the acquired image data and the calculated evaluation values. The reliability information here corresponds to the calculated evaluation value. The reliability of the evaluation value is information for determining whether the acquired evaluation value can be used. The distance information about the distance to the subject can be calculated with high accuracy by calculating the representative evaluation value using the evaluation values with high reliability as the reliability information. Here, six methods will be described as the method of calculating the reliability information.

A first reliability information calculation method uses the contrast of an image. In calculation of the evaluation value and the parallax value in the present exemplary embodiment, the parallax value is calculated from two pairs of images. In this process, in an area with a low contrast of a signal of an image, the minimum value from the correlation amount C(k) is determined with lower accuracy. Here, the reliability information using the contrast of the image can be calculated by calculating the variance of luminance from the luminance of each pixel and the periphery of the pixel, and setting a high reliability area with the value of the variance greater than or equal to a predetermined first value (a contrast threshold).

A second reliability information calculation method uses the luminance of an image. In calculation of the parallax value as the evaluation value in the present exemplary embodiment, the parallax value is calculated from two pairs of images. In this process, the parallax value is calculated with lower accuracy for an area where a signal of an image is too bright (too high luminance) or too dark (too low luminance). Here, the reliability information using the luminance of the image can be calculated by setting a high reliability area with the luminance value of each pixel of the image smaller than or equal to a predetermined second value (a luminance maximum threshold), or greater than or equal to a predetermined third value (a luminance minimum threshold).

A third reliability information calculation method uses the defocus value. In general, a greater absolute value of the defocus value results in a larger blur of an image and a lower ranging accuracy.

Thus, the reliability information using the defocus value can be determined to indicate high reliability with the defocus value of each pixel of the image smaller than or equal to a predetermined fourth value (a defocus value maximum threshold), or greater than or equal to a predetermined fifth value (a defocus value minimum threshold).

A fourth reliability information calculation method uses the parallax value. In general, a greater absolute value of the parallax value results in a relatively greater defocus value, and a lower ranging accuracy. However, a conversion coefficient for converting the parallax value into the defocus value varies depending on the image capturing conditions, and thus, if the image capturing conditions are different, the amount of blur can vary even if the parallax values are the same. Thus, the method of calculating the reliability information using the parallax value, if the image capturing condition is unknown and the defocus value cannot be calculated. Meanwhile, conceivably, as the parallax value is greater, the area is relatively more defocused, irrespective of the image capturing condition. For this reason, with the parallax value of each pixel of the image smaller than or equal to a predetermined sixth value (a parallax value maximum threshold), or greater than or equal to a predetermined seventh value (a parallax value minimum threshold), the reliability information using the parallax value can be determined to indicate high reliability.

A fifth reliability information calculation method uses the distance value. The distance value here is the distance from the sensor plane of the image pickup apparatus to the subject calculated by the expression (8) described above, and will be referred to as "distance value A" for convenience. A greater absolute value of the difference between the distance value (here referred to as "distance value B") from the image pickup apparatus to the in-focus position and the distance value A means that the area is relatively more defocused, resulting in lower ranging accuracy. The amount of change of defocus varies depending on whether the value of the difference is positive or negative, i.e., whether a shift with respect to the in-focus position is frontward or rearward. For this reason, the reliability information using the distance value A can be determined to indicate high reliability with the distance value A corresponding to each pixel of the image smaller than or equal to a predetermined eighth value (a maximum threshold of the distance value A), or greater than or equal to a predetermined ninth value (a minimum threshold of the distance value A).

A sixth reliability calculation method uses the standard deviation of at least one of the parallax value or the defocus value. Outliers can be removed from the evaluation values by using the standard deviation. The reliability information can be determined to indicate high reliability with the calculated standard deviation being within a predetermined range of values (a standard deviation threshold).

In this way, the reliability information can be calculated from the acquired image data and the evaluation values. In the present exemplary embodiment, the reliability information may be obtained using at least one of the six reliability information calculation methods described above.

The evaluation value of the target area and the reliability information can be thereby acquired in step S302.

In step S303, the evaluation value/reliability information calculation unit 106 evaluates the number of target areas to determine whether there is a plurality of target areas. If there is a plurality of target areas (YES in step S303), the operation proceeds to step S304. If there is one target area (NO in step S303), the operation proceeds to step S305.

(Description of Case of is Plurality of Target Areas)

In step S304, the representative evaluation value calculation unit 107 determines a representative area from the target areas and calculates the representative evaluation value. The method of calculating the representative evaluation value from the target areas will be described with reference to FIGS. 8A to 8C.

Figure 8A:
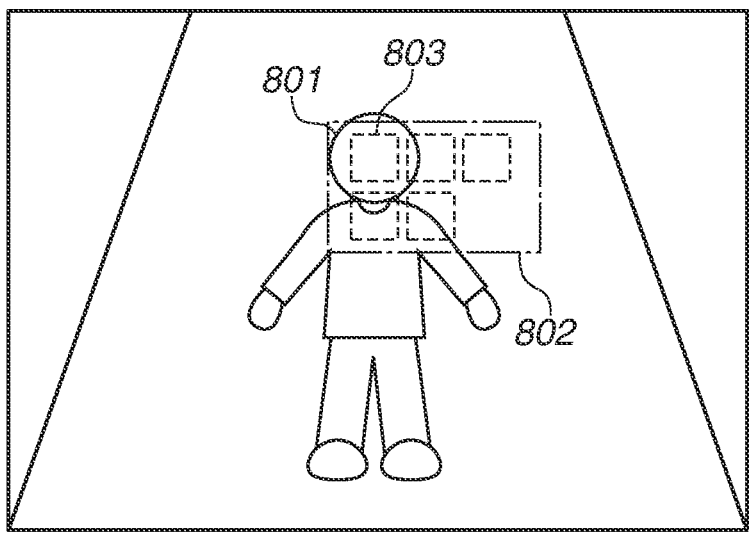
FIGS. 8A, 8B, and 8C illustrate a case of a plurality of target areas according to the first exemplary embodiment.

FIG. 8A illustrates a scene with a plurality of target areas. A subject 801 in FIG. 8A is a main subject to be focused in the present exemplary embodiment. A range 802 indicates the target areas. A target area 803 indicates one of the target areas.

In this way, with a plurality of target areas, the evaluation value (area evaluation value) of an area corresponding to each of the target areas is calculated, and then the representative evaluation value is calculated using the evaluation value of the target area where the absolute value of the area evaluation value is minimum. In the method of calculating the area evaluation value, the parallax value, the defocus value, or the absolute value of the difference between the distance value B and the distance value A is used.

For the area evaluation value, the mean value, the median value, or the minimum value of the evaluation value is calculated in each target area. In one embodiment, the median value or the mean value is used to reduce the influence of outliers in each target area, but the minimum value may be used. Out of those, at least one area evaluation value is calculated in each target area, and the representative evaluation value is calculated using the evaluation value of the area where the absolute value thereof is minimum.

Figure 8B:
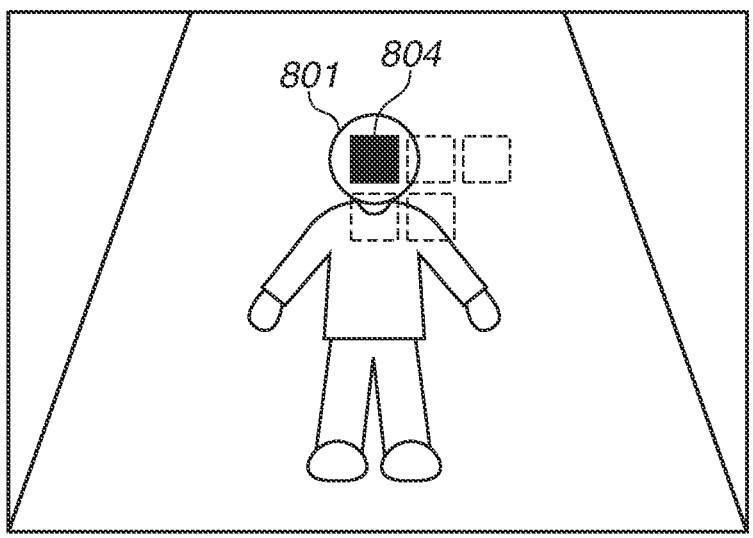
Figure 8C:
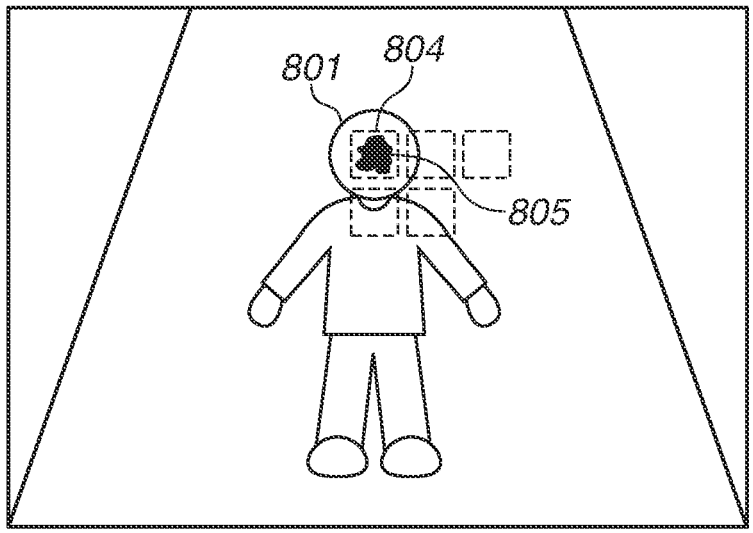

FIG. 8B illustrates an area 804 where the area evaluation value is minimum. Further, as indicated by an area 805 in FIG. 8C, the representative evaluation value can be calculated from the distance information in an area where the reliability information indicates high reliability within the area 804 as the target area. The area evaluation value can be also calculated using the evaluation value of the high reliability information within the target using the reliability information beforehand, and the calculated area evaluation value can be used as the representative evaluation value.

With a plurality of target areas, if no reliability information indicates high reliability in each of the target areas, calculation of the evaluation value and then determination of the target area can be omitted. This can reduce the processing load.

The representative evaluation value can be thereby calculated from the target areas. This makes it possible to calculate the representative evaluation value for the acquisition of the distance information about the distance to the subject from the target areas.

In step S305, the evaluation value/reliability information calculation unit 106 evaluates the size of the target area to determine whether the size of the target area is large. If the size of the target area is large (YES in step S305), the operation proceeds to step S306. If the size of the target area is small (NO in step S305), the operation proceeds to step S307.

(Description of Case where Size of Target Area is Larger than Predetermined Size)

In step S306, the representative evaluation value calculation unit 107 calculates the representative evaluation value from the target area. The method of calculating the representative evaluation value from the target area will be described with reference to FIGS. 9A to 9C.

Figure 9A:
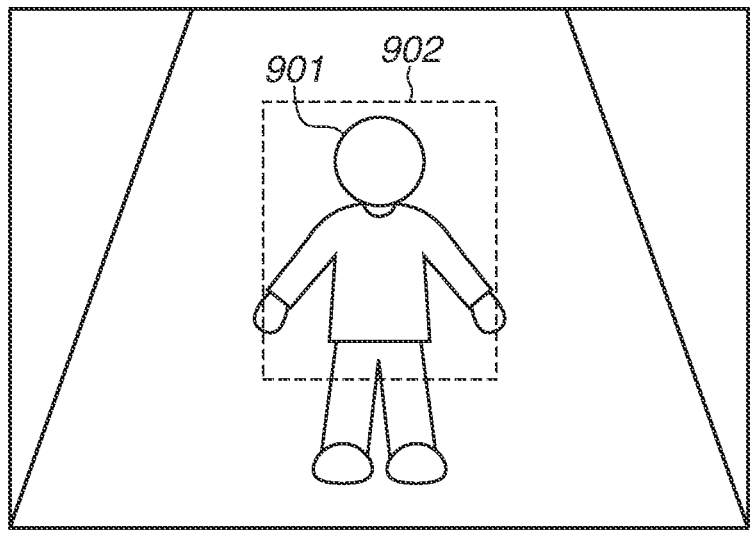
FIGS. 9A, 9B, and 9C illustrate a case of a large target area according to the first exemplary embodiment.

FIG. 9A illustrates a scene where the target area has a size larger than a predetermined size. A subject 901 in FIG. 9A is a main subject to be focused in the present exemplary embodiment. A target area 902 indicates the target area having a size larger than a predetermined size.

If the target area is thus larger than the predetermined size, the evaluation value/reliability information calculation unit 106 divides the target area into a plurality of divisional areas, and calculates an area evaluation value corresponding to each of the divisional areas. Subsequently, the representative evaluation value calculation unit 107 calculates the representative evaluation value using the calculated area evaluation value of each of the areas.

In the method of calculating the area evaluation value, the parallax value, the defocus value, or the absolute value of the difference between the distance value B and the distance value A is used. Here, the mean value, the median value, or the minimum value of the evaluation value in each of the divisional areas is calculated as the area evaluation value, and the representative evaluation value is calculated using the evaluation value of an area where the absolute value of the calculated area evaluation value is minimum.

In the following two methods, the calculation can also be performed using a plurality of evaluation values having high reliability with the reliability information calculated in step S402, in calculation of the representative evaluation value. This provides a higher accurate representative area and representative evaluation value.

The two methods of calculating the area evaluation value will be described.

Figure 9B:
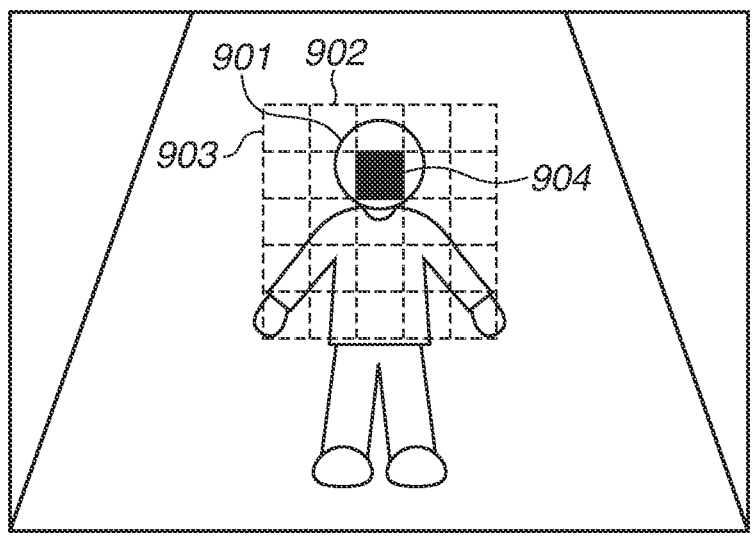

A first method is a method in which the evaluation value/reliability information calculation unit 106 divides the target area into a plurality of divisional areas, and calculates the area evaluation value for each of the divisional areas, so that the evaluation value of an area where the absolute value of the area evaluation value is minimum is the area evaluation value. FIG. 9B illustrates the method of dividing the target area into a plurality of areas, and calculating the area evaluation value for each of the divisional areas. A divisional area 903 indicates one of the areas into which the target area 902 is divided. The division size of the target area can be freely set, but the minimum size of the AF frame that can be set in the image pickup apparatus is used as the division size, so that the area can be evaluated using an index as with a plurality of target areas. In this way, the target area is divided into the divisional areas and the area evaluation value is calculated for each of the divisional areas, so that the area evaluation value of the area where the absolute value of the area evaluation value is minimum can be the representative evaluation value. A divisional area 904 is an example of the area having the evaluation value used in calculation of the representative evaluation value.

Figure 9C:
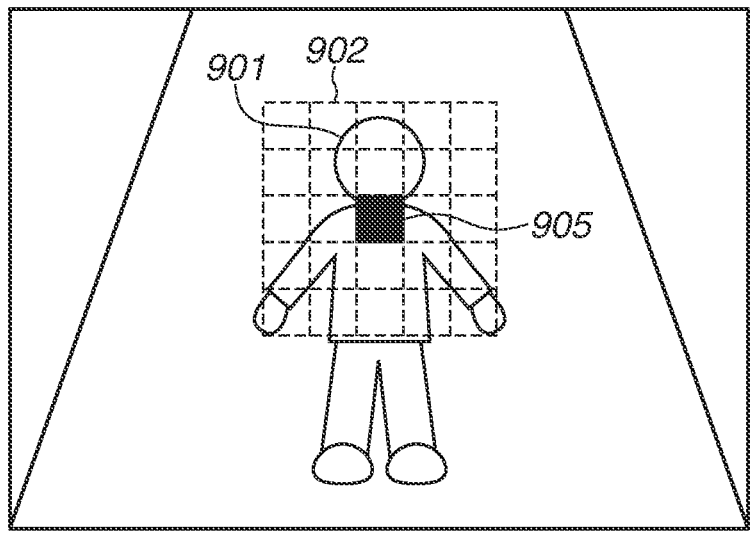

A second method is a method in which the evaluation value/reliability information calculation unit 106 divides the target area into a plurality of divisional areas, and selects the evaluation value of an area (near-center area) near the central portion of the target area among the divisional areas, as the area evaluation value. FIG. 9C illustrates the method of dividing the target area into the areas, and selecting the evaluation value of the area near the central portion of the target area among the divisional areas as the area evaluation value. A divisional area 905 is a central area near the central portion of the target area among the divisional areas of the target area. The divisional area 905 is used as the central area, and the area evaluation value is calculated from the evaluation value of the central area, so that the calculated area evaluation value can be the representative evaluation value. It is expected that the subject to be automatically focused is more likely to be higher in the area near the central portion of the target area than in the surrounding divisional areas. In addition, the subject is more likely to exist in an area closer to the center of the target area generated by the image recognition as well. Because the area evaluation value is calculated using an area alone that is near the central portion in the target area, the calculation cost for other areas can be reduced.

The area evaluation value may be calculated using a partial area including the central area, as well as using the central portion of the target area.

As described above, an appropriate parallax value, defocus value, or distance value can be determined and the representative evaluation value can be calculated even with a plurality of target areas or a large target area. In both of the two methods described above, the evaluation value/reliability information calculation unit 106 divides the target area into the areas, but the representative evaluation value calculation unit 107 may perform this division.

(Description of Case with the Target Area Smaller than Predetermined Size)

In step S307, the representative evaluation value calculation unit 107 calculates the representative evaluation value from the target area.

Because the number of target areas is not two or greater and the size of the target area is smaller than the predetermined size in step S307, the representative evaluation value can be calculated by determining that the area evaluation value calculated for the target area is the representative evaluation value. The representative evaluation value can be calculated using the evaluation value of the high reliability area alone using the reliability information calculated in step S402. This can increase the accuracy of the representative evaluation value. The representative evaluation value can also be calculated by the above-described method in step S304 or step S306.

As described above, the representative evaluation value can be calculated even if the number of target areas is not two or greater or the size is smaller than the predetermined size.

This completes the calculation of the representative evaluation value in step S203.

(Description of Method of Calculating Distance Information about Distance to Subject)

In step S204, the distance-to-subject information calculation unit 108 calculates distance information about the distance to the subject using the representative evaluation value calculated in step S203.

The distance information about the distance to the subject can be calculated by the following formulas (9) to (11).

$$a1 = BL\_m \times (f \times BP\_m + (din \times f \times f)/(din-f)) \quad (9)$$

$$a2 = BL\_m \times (BP\_m + (f \times f)/(din-f)) \quad (10)$$

$$dout = (f \times dre + a1)/(f \times dre + a2) \quad (11)$$

Here, "a1" and "a2" are values to express the formula (11) in a simple way. In these formulas, "BL_m" is the mean value or the median value of BL values corresponding to the area where the evaluation values used to calculate the representative evaluation value are distributed, "BP_m" indicates the mean value, the median value, or the minimum value of BP values corresponding to the area where the evaluation values used to calculate the representative evaluation value are distributed, and "f" represents the focal length. The BP value is a correction value for correcting a shift amount of an in-focus distance due to an image height. Further, "din" represents the distance value representing the distance from the image pickup apparatus to the in-focus position, "dre" represents the representative evaluation value calculated from the parallax value, and "dout" represents the distance information about the distance from the image pickup apparatus to the subject.

If dre is calculated as the representative evaluation value based on the defocus value, this value can be converted into the parallax value using the following formula (12).

$$dre\_x = (dre\_d - BP\_m)/BL\_m \quad (12)$$

Here, "dre_d" represents the representative evaluation value based on the defocus value, and "dre_x" represents the representative evaluation value based on the parallax value.

If the representative evaluation value is calculated based on the absolute value of the difference between the distance value B and the distance value A, the distance information about the distance to the subject can be calculated by calculating the sum of a value not taking the absolute value and the distance value B when the representative evaluation value is calculated.

As described above, the distance information about the distance to the subject can be acquired with high accuracy, even with a plurality of target areas or a large target area.

Use of the acquired highly accurate distance information in adjustment of the image pickup optical system of the image pickup apparatus 110 allows adjustment of the in-focus position.

A second exemplary embodiment of the disclosure will be described.

In the first exemplary embodiment of the disclosure, the method of calculating the distance information about the distance to the subject has been described. In the second exemplary embodiment of the disclosure, a method will be described of generating an image in which a determined representative area is displayed in a superimposed manner.

(Description of Image Processing Apparatus)

The second exemplary embodiment of the disclosure will be described in detail with reference to drawings.

Figure 10:
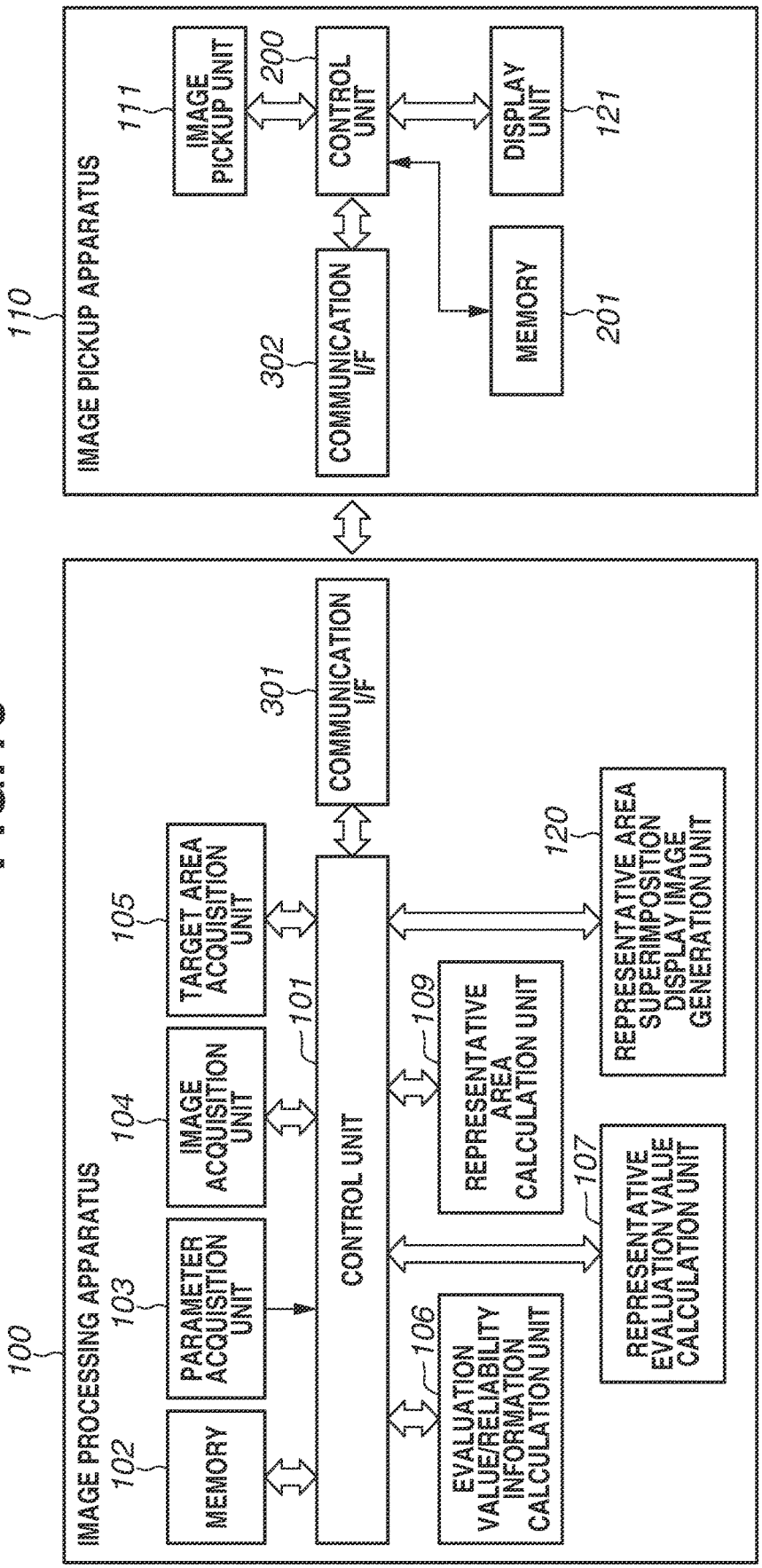
FIG. 10 is a block diagram illustrating an overall configuration according to a second exemplary embodiment.

FIG. 10 illustrates an image processing apparatus 100 and an image pickup apparatus 110 according to the present exemplary embodiment.

As compared with FIG. 1A, FIG. 10 is different in that the distance-to-subject information calculation unit 108 is not included, and a representative area calculation unit 109, a representative area superimposition display image generation unit 120, and a display unit 121 are added.

The representative area calculation unit 109 calculates a representative area based on a representative evaluation value calculated by a representative evaluation value calculation unit 107, and supplies the calculated representative area to a memory 102. Based on the representative area calculated by the representative evaluation value calculation unit 107, the representative area superimposition display image generation unit 120 generates an image in which the representative area is superimposed on an image acquired by an image acquisition unit 104, and supplies the generated image to the memory 102.

A method of implementing the second exemplary embodiment of the disclosure in the image processing apparatus 100 and the image pickup apparatus 110 thus configured will be described in detail with reference to an operation flowchart illustrated in FIG. 11.

Figure 2:
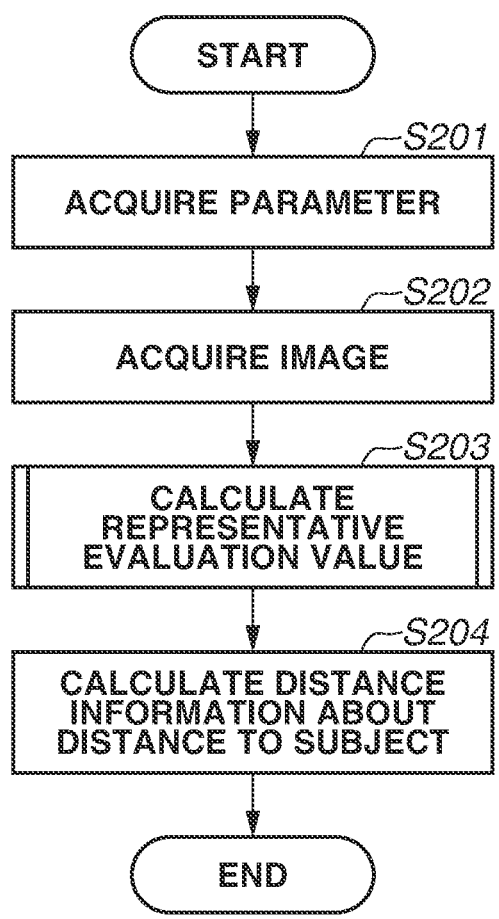
FIG. 2 is an operation flowchart illustrating an overall operation according to the first exemplary embodiment.

In step S1101 and step S1102, operations similar to the operations in step S201 and step S202 in FIG. 2 described above are performed. In step S1103, a representative area is calculated by selecting an area limited to calculate a representative evaluation value as the representative area, when the representative evaluation value is calculated in a manner similar to step S203. An operation procedure in step S1103 will be described with reference to FIG. 12.

Figure 12:
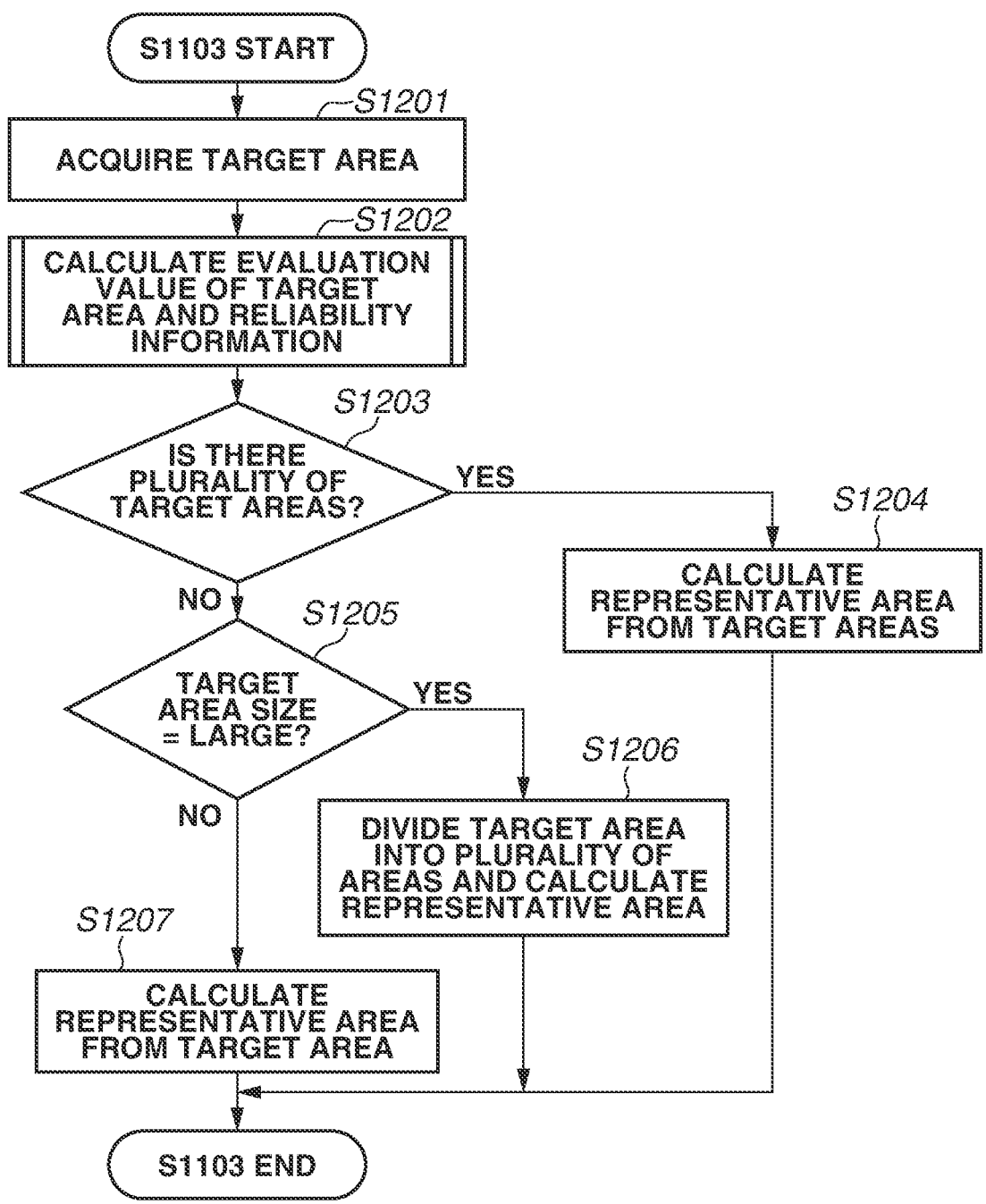
FIG. 12 is an operation flowchart illustrating an operation in a method of calculating a representative area according to the second exemplary embodiment.

FIG. 12 is an operation flowchart illustrating the method of calculating the representative area.

Figure 3:
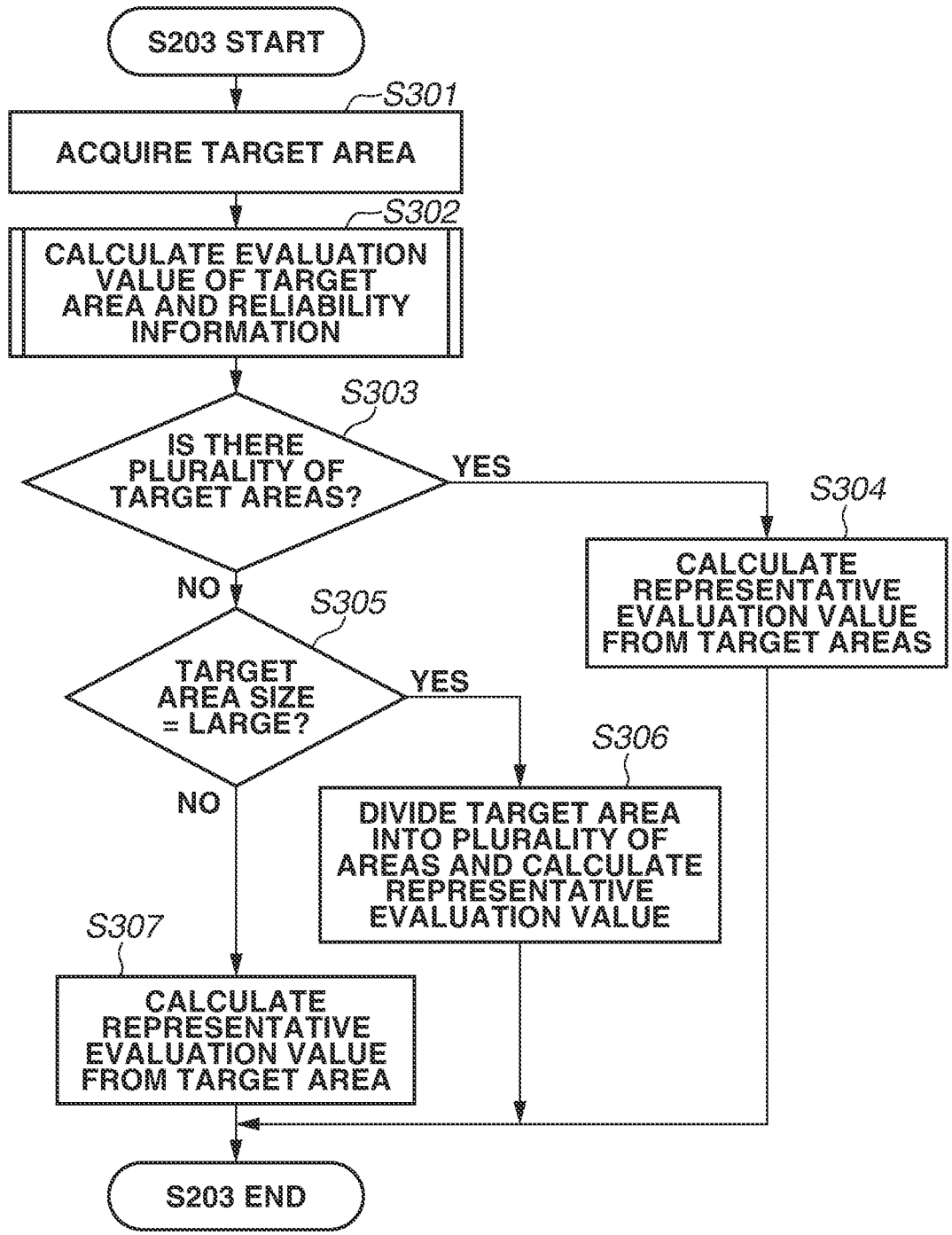
FIG. 3 is an operation flowchart illustrating a method of calculating a representative evaluation value according to the first exemplary embodiment.

Step S1201 and step S1202 are similar to step S301 and step S302 in FIG. 3.

In step S1203, an evaluation value/reliability information calculation unit 106 evaluates the number of target areas to determine whether there is a plurality of target areas. If there is a plurality of target areas (YES in step S1203), the operation proceeds to step S1204. If there is one target area (NO in step S1203), the operation proceeds to step S1205.

In step S1204, the representative area calculation unit 109 calculates a target area similar to the target area used when the representative evaluation value is calculated in step S304, as the representative area. The representative area can be thereby calculated using the evaluation value and the reliability information even with a plurality of target areas.

In step S1205, the evaluation value/reliability information calculation unit 106 evaluates the size of the target area to determine whether the size of the target area is large. If the size of the target area is large (YES in step S1205), the operation proceeds to step S1206. If the size of the target area is small (NO in step S1205), the operation proceeds to step S1207.

In step S1206, a target area similar to the target area used when the representative evaluation value is calculated in step S306 is calculated as the representative area. The representative area can be thereby calculated using the evaluation value and the reliability information even with a large target area.

In step S1207, a target area similar to the target area used when the representative evaluation value is calculated in step S307 is calculated as the representative area. The representative area can be thereby calculated using the evaluation value and the reliability information even if the number of target areas are not two or greater and the size of the target area is small.

This completes the calculation of the representative area in step S1103.

(Description of Method of Generating Image in which Representative Area is Superimposed)

In step S1104, the representative area superimposition display image generation unit 120 generates an image (a superimposed image) in which the representative area is superimposed, and displays the generated image on the display unit 121 of the image pickup apparatus 110. In FIG. 10, the display unit 121 is included in the image pickup apparatus 110, but may be included in the image processing apparatus 100, and is not limited to these configurations if a user can confirm a superimposed image on at least one of these apparatuses.

The method of generating the image in which the representative area is superimposed will be described with reference to FIGS. 13A to 13E. FIGS. 13A to 13E can be understood as examples of the image displayed on the display unit 121.

Figure 13A:
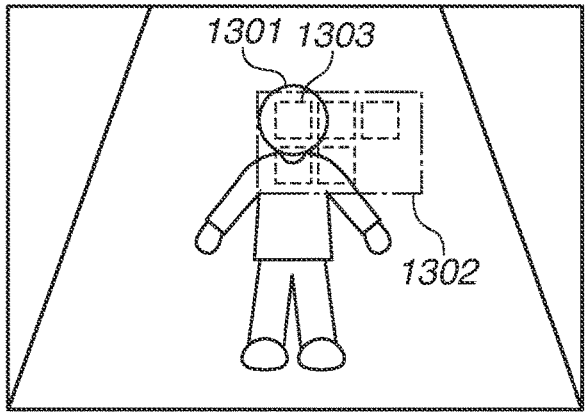
FIGS. 13A to 13E illustrate superimposition display of a representative area according to the second exemplary embodiment.

FIG. 13A illustrates a scene where there is a plurality of target areas. A subject 1301 in FIG. 13A is a main subject to be focused in the present exemplary embodiment. A range 1302 indicates the target areas. A target area 1303 indicates one of the target areas.

Figure 13B:
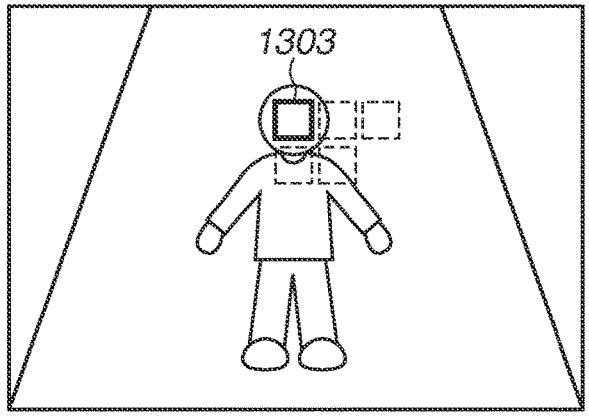

Suppose the target area including the representative area calculated in step S1103 is the target area 1303. In this case, the representative area can be superimposed by emphasizing the target area including the representative area among the target areas, as illustrated in FIG. 13B.

Figure 13C:
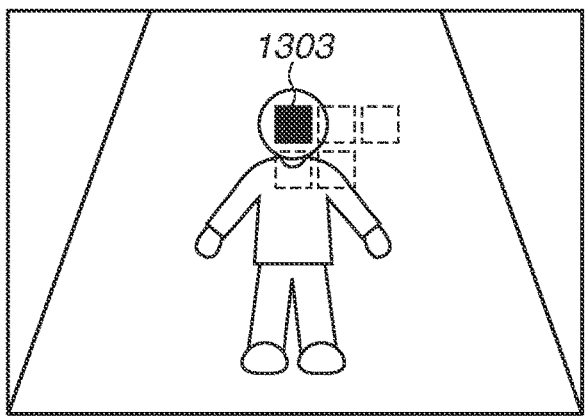

To superimpose the representative area, there are a method of displaying an area including the representative area among the target areas, a method of changing the color of the frame of the target area including the representative area, and a method of switching the frame of the target area including the representative area to a solid line or a dotted line. Further, there is a method of filling in the target area including the representative area as illustrated in FIG. 13C. In addition, the representative area can be superimposed with the texture of the image left, by changing the value of R alone in RGB information about the image.

Figure 13D:
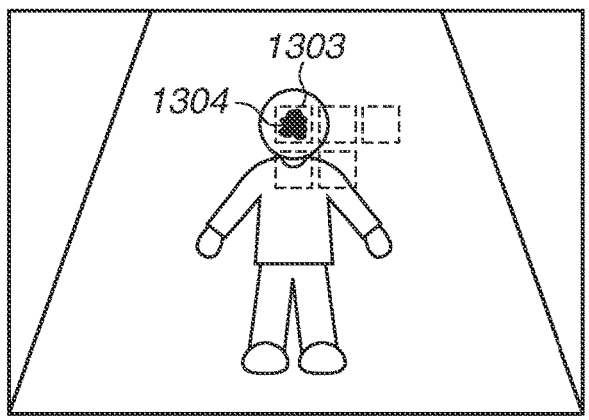
Figure 13E:
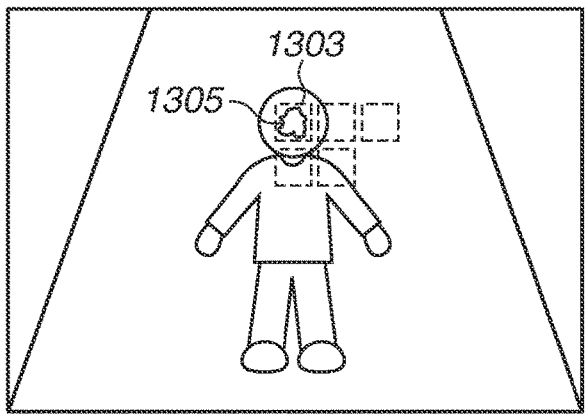

Further, the representative area determined by limiting an evaluation area in the target area using the reliability information can be superimposed in the target area including the representative area. FIG. 13D is a diagram for describing a method of superimposing the representative area calculated with the evaluation area in the target area limited to a high reliability area using the reliability information. As indicated by a representative area 1304 in FIG. 13D, a method of filling in the representative area can be used. In addition, the representative area can be superimposed with the texture of the image left, by changing the value of R alone in the RGB information about the image. Further, as illustrated in FIG. 13E, the edge portion alone of the representative area can be displayed.

A method of filling in the representative area is effective due to a higher visibility of a small representative area. The display of the dotted line or frame alone has the effect of making it easy to compare the image and the representative area. In addition, by alternately displaying an image on which the representative area is superimposed and the image on which the representative area is not superimposed to preview the representative area as if the representative area were blinking, that provides an easy comparison with the images or an improved visibility of the representative area.

The scene where there is a plurality of target areas is described with reference to FIGS. 13 to 13E. In addition, if the target area is large or if there is one target area that has a small size, the methods described with reference to FIGS. 13A to 13E can apply to a superimposition display of the representative area.

As described above, the image in which the representative area is superimposed on the acquired image can be generated. This makes it possible for the user to readily confirm which area is focused and the distance to which area in the image is the distance to the subject in the distance information.

As described above, the image in which the representative area is superimposed on the acquired image can be generated.

In the first exemplary embodiment, the image processing apparatus 100 and the image pickup apparatus 110 are configured to be independent of each other. Here, a third exemplary embodiment in which an image pickup apparatus 400 as illustrated in FIG. 14 is configured of a combination of the image pickup apparatus 110 and the image processing apparatus 100 will be described.

In FIG. 14, an image acquired by an image pickup unit 111 is provided to an image acquisition unit 104 via a control unit 401. In consideration of cases of using images captured by an apparatus other than the image pickup apparatus 400 illustrated in FIG. 14, a communication I/F 402 is provided in FIG. 14, so that information can be exchanged with outside under the control of the control unit 401.

Figure 11:
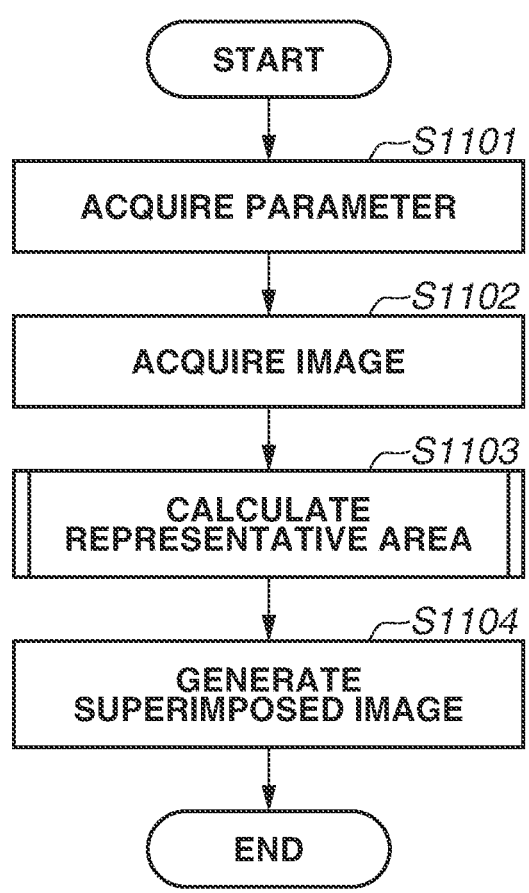
FIG. 11 is an operation flowchart illustrating an overall operation according to the second exemplary embodiment.

Further, the image processing apparatus 100 and the image pickup apparatus 110 are combined unlike FIG. 1 and FIG. 11, so that the role of the memory 201 is integrated with a memory 102, and the communication I/F 301 and the communication I/F 302 are not included as illustrated in FIG. 14.

The image pickup apparatus 400 operates based on an instruction of the control unit 401 and can exchange information with other components. The operation of each component in FIG. 14 is similar to the operation described in the first exemplary embodiment and the second exemplary embodiment. In addition, an unnecessary configuration may be removed from FIG. 14, depending on whether the first exemplary embodiment or the second exemplary embodiment is implemented.

In this way, the image pickup apparatus can be provided that can implement the first exemplary embodiment and the second exemplary embodiment.

Other Exemplary Embodiments

The aspect of the embodiments can also be implemented by processing for supplying a program for implementing one or more functions in the above-described exemplary embodiments to a system or apparatus via a network or a storage medium and causing one or more processors in a computer of the system or apparatus to read and run the program. The aspect of the embodiments can also be implemented by a circuit (for example, an application specific integrated circuit (ASIC)) that implements the one or more functions.

While the exemplary embodiments of the disclosure have been described above, the disclosure is not limited to these exemplary embodiments, and can be modified and changed in various manners within the scope of the spirit thereof.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-181188, filed Nov. 5, 2021, which is hereby incorporated by reference herein in its entirety.

What is claimed is:

1. An apparatus comprising:
one or more processors; and
a memory storing instructions which, when executed by the one or more processors, cause the apparatus to function as:
an image acquisition unit configured to acquire a captured image;
a parameter acquisition unit configured to acquire a parameter recorded when the image is captured;
a determination unit configured to determine a target area in the image using the parameter corresponding to the image;
an evaluation value calculation unit configured to calculate one or more evaluation values from the target area based on a number of the target areas and a size of the target area;
a representative evaluation value calculation unit configured to calculate a representative evaluation value from the evaluation value; and
a distance information calculation unit configured to calculate distance information about a distance to a subject in the image based on the representative evaluation value,
wherein the representative evaluation value is calculated by determining the target area based on an automatic focus (AF) frame area, and using the evaluation value within the target area.

2. The apparatus according to claim 1, wherein the parameter is at least one of a distance from a sensor plane of an image pickup apparatus to an in-focus position, a conversion coefficient determined by an open angle between centroids of respective light fluxes passing through a pair of ranging pupils, a focal length, a position of the AF frame area, a position of an area where a face is recognized, or a distance from an image-side principal point in a lens of an image pickup unit of the image pickup apparatus to the sensor plane.

3. The apparatus according to claim 2, wherein the representative evaluation value is calculated by determining the target area based on image recognition information, and using the evaluation value within the target area.

4. The apparatus according to claim 1, wherein at least one of the evaluation values is a parallax value, a defocus value, or a distance value representing a distance from a sensor plane of an image pickup apparatus to the subject.

5. The apparatus according to claim 4, wherein the parallax value, the defocus value, or the distance value is calculated from an image for ranging, the image being based on subject light fluxes passing through different pupil areas of an image pickup optical system and captured by the image pickup apparatus.

6. The apparatus according to claim 1, wherein the distance information about the distance to the subject is calculated using distance information about a distance from the subject to an in-focus position, the representative evaluation value, and a shift amount of an in-focus distance due to an image height.

7. The apparatus according to claim 1, wherein the representative evaluation value is calculated using, among the evaluation values, the evaluation value corresponding to reliability greater than a predetermined value.

8. The apparatus according to claim 7, wherein, for the reliability information, a contrast of the image corresponding to the evaluation value is calculated, and high reliability is determined for the evaluation value corresponding to the contrast whose value is higher than a predetermined first value.

9. The apparatus according to claim 7, wherein, for the reliability information, a luminance of the image corresponding to the evaluation value is acquired, and high reliability is determined when a value of the luminance of the image is smaller than or equal to a predetermined second value, or greater than or equal to a predetermined third value, the third value being smaller than the second value.

10. The apparatus according to claim 7, wherein, for the reliability information, a parallax value corresponding to the evaluation value is acquired, and high reliability is determined when the evaluation value is smaller than or equal to a predetermined fourth value, or greater than or equal to a predetermined fifth value, the fifth value being smaller than the fourth value.

11. The apparatus according to claim 7, wherein, for the reliability information, a defocus value corresponding to the evaluation value is acquired, and high reliability is determined when the defocus value is smaller than or equal to a predetermined sixth value, or greater than or equal to a predetermined seventh value, the seventh value being smaller than the sixth value.

12. The apparatus according to claim 7, wherein, for the reliability information, a distance value corresponding to the evaluation value is acquired, the distance value representing a distance from a sensor plane of an image pickup apparatus to the subject, and high reliability is determined when the distance value is smaller than or equal to a predetermined eighth value, or greater than or equal to a predetermined ninth value, the ninth value being smaller than the eighth value.

13. The apparatus according to claim 7, wherein, for the reliability information, a standard deviation of the evaluation value is calculated, and high reliability is determined when the standard deviation is within a predetermined range.

14. The apparatus according to claim 1, wherein, with a plurality of target areas each as the target area, the evaluation value calculation unit calculates an area evaluation value corresponding to each of the target areas using the evaluation value within each of the areas, and the representative evaluation value calculation unit calculates the representative evaluation value using the evaluation value of the target area where an absolute value of the area evaluation value is minimum.

15. The apparatus according to claim 1, wherein the evaluation value calculation unit divides the target area into a plurality of divisional areas and calculates an area evaluation value corresponding to each of the divisional areas using the evaluation value of each of the areas, and the representative evaluation value calculation unit calculates the representative evaluation value using the evaluation value of the divisional area where an absolute value of the area evaluation value is minimum.

16. The apparatus according to claim 15, wherein a division size of the divisional area is a minimum size of an AF frame that is settable by an image pickup apparatus.

17. The apparatus according to claim 1, wherein the representative evaluation value calculation unit calculates the representative evaluation value using an evaluation value alone of a partial area including a center of the target area among the divisional areas.

18. The apparatus according to claim 1, wherein the instructions which, when executed by the one or more processors, cause the apparatus to further function as:
an image generation unit configured to generate a superimposed image in which a representative area is superimposed on the image; and
a display unit configured to display the superimposed image.

19. A control method for an apparatus, the control method comprising:
acquiring a captured image;
acquiring a parameter recorded when the image is captured;
determining a target area in the image using the parameter corresponding to the image;
calculating one or more evaluation values from the target area based on a number of the target areas and a size of the target area;
calculating a representative evaluation value from the evaluation value; and
calculating distance information about a distance to a subject in the image based on the representative evaluation value,
wherein the representative evaluation value is calculated by determining the target area based on an automatic focus (AF) frame area, and using the evaluation value within the target area.

20. A non-transitory computer-readable storage medium storing a program for causing a computer to perform a control method, the method comprising:
acquiring a captured image;
acquiring a parameter recorded when the image is captured;
determining a target area in the image using the parameter corresponding to the image;
calculating one or more evaluation values from the target area based on a number of the target areas and a size of the target area;
calculating a representative evaluation value from the evaluation value; and
calculating distance information about a distance to a subject in the image based on the representative evaluation value,
wherein the representative evaluation value is calculated by determining the target area based on an automatic focus (AF) frame area, and using the evaluation value within the target area.

* * * * *